Oct. 19, 1965  E. WALDEN  3,212,290
UNIVERSAL JOINTS AND LIKE COUPLINGS
Filed May 21, 1963  2 Sheets-Sheet 1
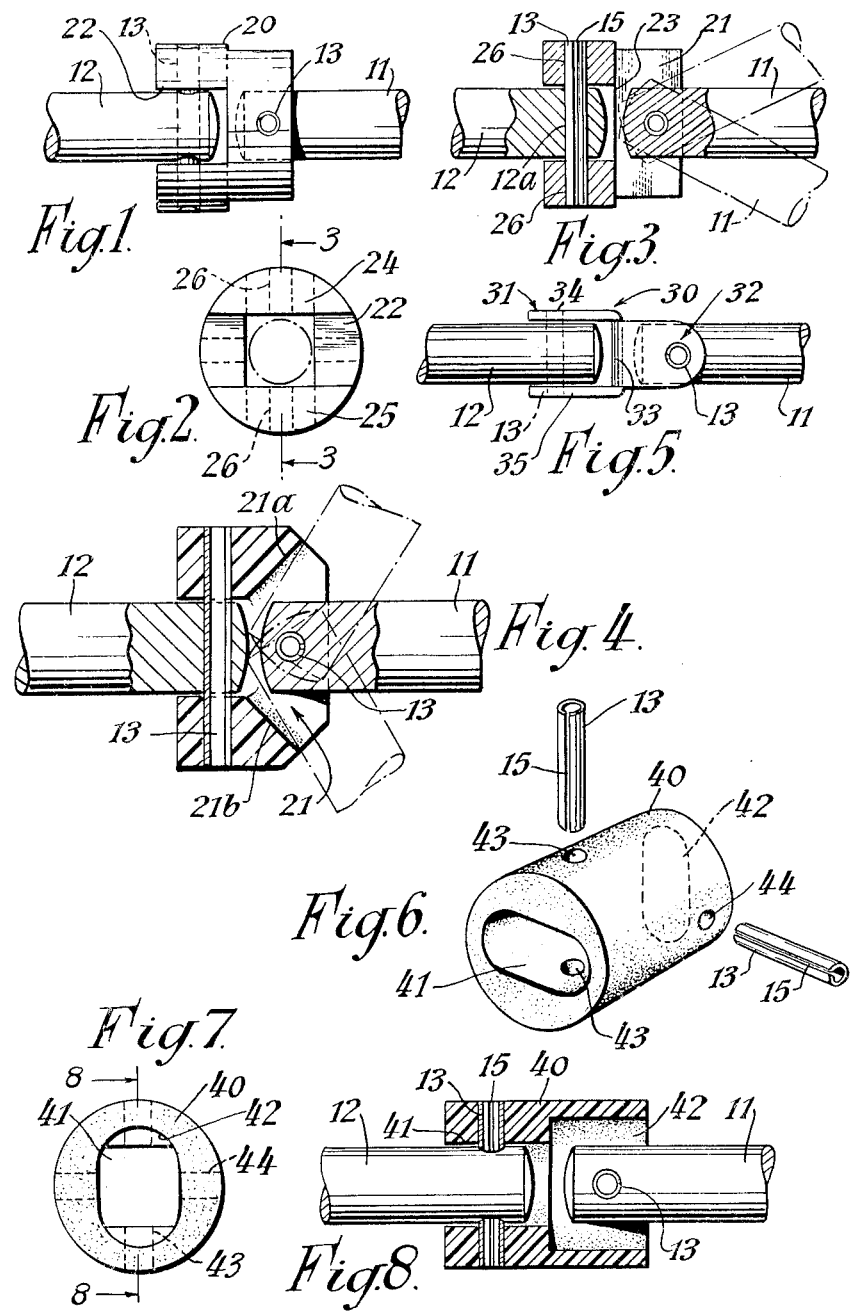
INVENTOR
Eric Walden
BY
Stevens, Davis, Miller & Mosher
ATTORNEYS Oct. 19, 1965  E. WALDEN  3,212,290
UNIVERSAL JOINTS AND LIKE COUPLINGS
Filed May 21, 1963  2 Sheets-Sheet 2

INVENTOR
Eric Walden
BY
Stevens, Davis, Miller + Mosher
ATTORNEYS

United States Patent Office 3,212,290
Patented Oct. 19, 1965

3,212,290
UNIVERSAL JOINTS AND LIKE COUPLINGS
Eric Walden, 4 Linton Court, Agar Grove,
London NW. 1, England
Filed May 21, 1963, Ser. No. 281,902
Claims priority, application Great Britain, May 22, 1962,
19,570/62
5 Claims. (Cl. 64—17)

This invention relates to universal joints and like couplings for conveying rotary motion from a driving member to a driven member. In particular the invention is concerned with the provision of a coupling which permits the transmission of torque on an axis which is deflected or misaligned with respect to the axis of the driving member. The design thereby permits component parts of an assembly to be installed without the necessity of ensuring accurate axial relationship. Alternately the couplings can form part of an assembly wherein a degree of axial or parallel misalignment is intended and in this respect each universal coupling can accommodate a relationship wherein the included angle formed by the axes of driven and driving members is as high as 45°.

An important aspect of the invention is concerned with the application of this feature of the coupling to the provision of a composite unit whereby an angled drive can be obtained with the driving and driven members located for rotation about constant axes located at an angle to each other.

Another important aspect of the invention is the provision of a coupling in which electrical insulation between the driving and driven members can be effected by substitution of materials without affecting the design of the coupling and without the introduction of additional components.

Yet another feature of the invention is the provision of a coupling which provides a backlash free transmission without the necessity of machining parts to a high degree of precision.

Yet another feature of the invention is the provision of a coupling that can be manufactured in a small lightweight size suitable for use in miniature or subminiature electrical equipment, domestic appliances such as washing machines and electric cookers, and control mechanisms associated with motor cars and also in a large robust size suitable for use in agricultural machinery, manipulation of hydraulic valves and mechanical handling equipment, without substantially altering the basic design of the coupling.

In its broadest aspect the invention provides a universal coupling or like joint for drivably connecting a driving member with a driven member, said coupling comprising a housing having a pair of slots formed one in each end thereof, said slots extending across the central longitudinal axis of the housing at right angles to each other and receiving respectively the adjacent ends of the driven and driving members, a pair of pins, studs or pivots each mounted in said housing to extend one across each of said slots to connect the driven and driving members to said housing and positioned so that the axes of the driven and driving members are colineal with the axis of the housing, wherein said pins, studs or pivots each fit tightly within apertures in the corresponding driving and driven members, the ends of said pins, studs or pivots being a sliding fit within the corresponding apertures in the housing to permit pivotal movement of said driven and driving members relative to said housing within said slots.

In one preferred embodiment of the invention the housing may be formed from circular stock bar, the pins, studs or pivots being mounted across diametral slots formed in each end of the bar at right angles to each other. In a second embodiment the housing may comprise a shackle in the form of a pair of U-shaped sections positioned back to back and at right angles one to the other, the arms of each U-shaped section supporting a transverse pin, stud or pivot to which the corresponding driving or driven member is pivotally connected. Preferably, the housing is made of a metal such as brass or steel, but if desired the housing can be moulded in a thermo-plastic such as acetal resin or nylon or one of the thermo-setting plastics. The use of a suitable plastic has the advantage of providing for electrical insulation between the driving and the driven members. In addition the use of a suitable thermo-plastic can eliminate the possibility of a backlash between the driving and the driven members as hereinafter described.

The pivots for the driving and driven members preferably comprise longitudinally split spring dowel pins which minimize noise and other problems such as backlash normally associated with bolt and nut connections of conventional couplings.

According to a further aspect of the invention there is provided an angled drive assembly comprising a pair of universal couplings of the kind described above conjoined by a common or intermediate shaft, a driving shaft pivotally connected to one coupling and located for rotation about a first constant axis, and a driven shaft pivotally connected to the said second coupling and located for rotation about a second constant axis. Preferably the assembly is mounted in a supporting fixture whereby the angle of drive can be predetermined and maintained.

In order that the invention may be closely understood some preferred embodiments will now be described by way of example with reference to the accompanying drawings, in which:

FIGURE 1 is a side elevation of one embodiment of the universal coupling according to the invention.

FIGURE 2 is an end view of the coupling of FIGURE 1 looking from the left with the left-hand shaft removed;

FIGURE 3 is a sectional view of the coupling of FIGURE 1 taken on the line 3—3 of FIGURE 2;

FIGURE 4 is a modified embodiment of the coupling of FIGURES 1 to 3.

FIGURE 5 is a side elevation of a third embodiment of a universal coupling according to the invention;

FIGURE 6 is a perspective view of a fourth embodiment of a universal coupling according to the invention showing in particular the construction of the pivot pins;

FIGURE 7 is an end view of the coupling of FIGURE 6 looking from the right;

FIGURE 8 is a sectional view of the coupling of FIGURE 6 taken on the line 8—8 of FIGURE 7 but with the driving and driven shafts in position.

Figure 9:
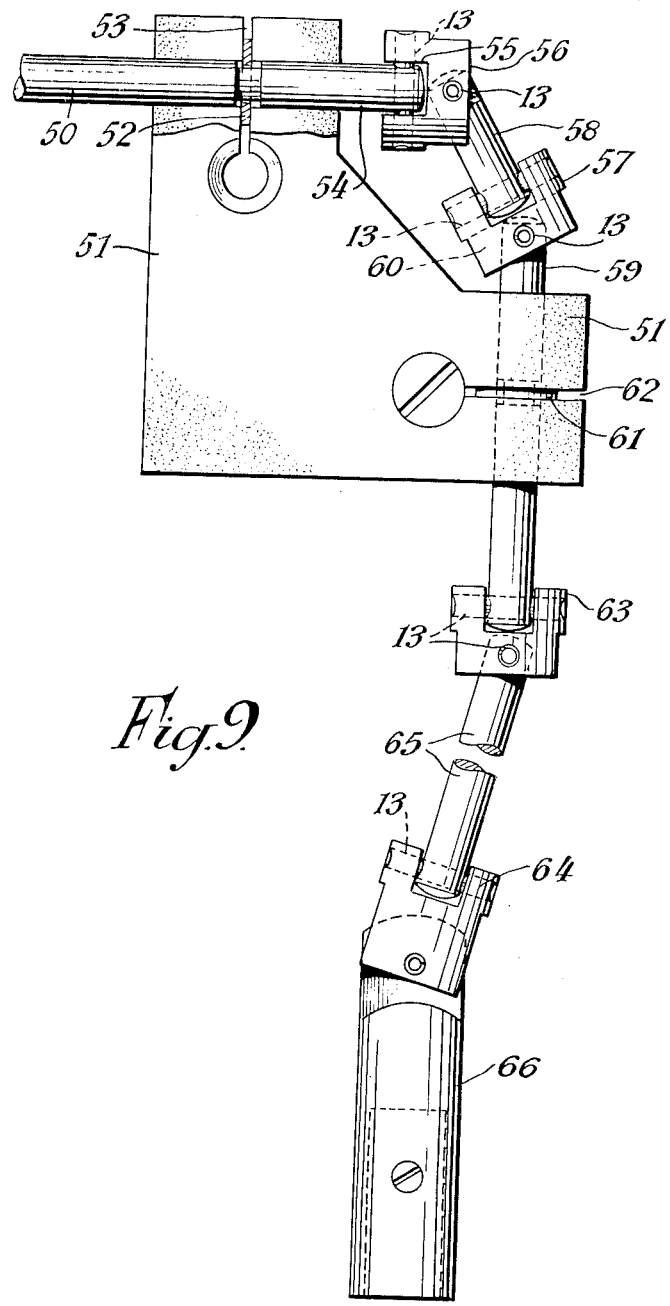
FIGURE 9 shows an assembly having an angled drive and parallel misalignment of the rotating shafts.

Referring now to the drawings, FIGURES 1 to 3 show one embodiment according to the invention for cojoining two axially rotating shafts or spindles. In this embodiment of the invention the device comprises a housing 20 formed from a circular bar to which are connected the adjacent ends of a driving shaft 11 and a driven shaft 12. The housing 20 is made of a suitable metal such as brass and as shown the ends of the shafts 11 and 12 are each pivotally connected to the housing 20 by means of a pin, stud or pivot. In the drawing the connector members are shown as pins 13. The pins 13 are mounted in the housing 20 at 90 degrees to each other and are spaced apart along the axis of the housing. Each of the shafts 11 and 12 is drilled at right angles to provide apertures for receiving the corresponding pivot pin 13 mounted in the housing 20. The pins 13 are so positioned as to locate the corresponding shaft 11 or 12 with its axis colineal with the axis of the housing 20.

The housing 20 is formed at one end with a dimetral slot 21, and at the other end with a diametral slot 22 which is cut at right angles to the slot 21. As shown in the drawings the slots slightly overlap at the centre of the housing 20 so that the slots communicate centrally at the aperture 23. As shown in FIGURE 2 of the drawings the provision of the slot 22 forms two side portions 24 and 25 which are suitably drilled to provide apertures 26 for receiving the ends of the pivot pin 13.

The construction of the pivot pins 13 is more clearly shown in FIGURE 6 of the drawings and it will be seen that the pins are of cylindrical construction and are split longitudinally as at 15. The pins 13 are made by rolling from a springy material such as steel and as shown in FIGURE 3 the arrangement is such that the pin 13 is a tight fit within the aperture 12a in the shaft 12. This is obtained by making the diameter of the aperture 12a slightly less than that of the pin 13. This means that the pin 13 is slightly compressed at its central portion which produces a slight taper at the ends of the pin. The ends of the pin 13 are pivotally mounted in the apertures 26 which means that the apertures 26 must approximate the maximum diameter of the ends of the pins. The arrangement may produce slight backlash with a metal housing but backlash can be eliminated by moulding the housing 20 in a resilient self-lubricated thermoplastic such as an acetal resin or nylon. With such a construction the ends of the pin 13 can be an interference fit in apertures 26. Furthermore, lubrication is avoided and the coupling is electrically insulating.

Similarly the cutting of the slot 21 provides similar side sections which are also drilled to provide apertures supporting pin 13 so as to pivotally mount the driving shaft 11 in the housing 20.

The apertures drilled in shafts 11 and 12 are so located that the adjacent ends of the shafts are located as close together as possible. Only a nominal clearance is required and as shown the ends of the shafts are rounded or chamfered to avoid any possible binding. The positioning of the shafts in this way reduces the oscillatory movement of the coupling.

It will be appreciated that the universal coupling as described with reference to FIGURES 1 to 3 can be used for the purpose of transmitting a torque along a deflected axis. Assuming that the driving shaft 11 is located on a true rotational axis by means of a bush or bearing, then the driven shaft 12 can be located at its outer extremity by a device such as a dog, or a ball and socket, which thus allows the axis of the driven shaft 12 to describe a cone the apex of which will be at the point of location at its outer extremity.

In the embodiment of FIGURES 1 to 3 the diametral slots 21 and 22 have been machined or moulded with a constant depth throughout their length so that the shafts 11 and 12 are each capable of a pivotal movement through approximately 180 degrees. Under normal operating conditions such a pivotal movement is not necessary and the coupling can be strengthened by machining or moulding the slots with inclined bottom or inner faces as shown in FIGURE 4. The inclined faces are shown at 21a, 21b in slot 21 and are such as to permit the shaft 11 a pivotal movement of 120 degrees.

The embodiments of FIGURES 1 to 4 are equally applicable to couplings of larger construction using, for example, solid connector pins. In such cases it may be necessary to provide bearings of "Teflon" or Phosphur bronze in the housing for the pins to avoid lubrication problems.

Referring now to FIGURE 5 of the drawings there is shown a further embodiment of the invention in which the universal joint comprises a shackle shown generally by the reference 30. The shackle comprises basically a pair of U-shaped members 31, 32 which are located at right angles to each other and are connected at their base section 33 so that the arms of the two U-shaped sections 31, 32 are located in different planes. The U-shaped section 31 has its arms 34, 35 drilled for receiving a connecting pin 13 for pivotally supporting the driven shaft 12, while the arms of the U-shaped section 32 are similarly drilled to receive a pin 13 supporting the driving shaft 11.

It will be seen that the universal coupling as shown in FIGURE 5 of the drawings provides a simple arrangement for mounting the shafts 11 and 12 while permitting pivotal movement to each shaft through an angle of substantially 180 degrees in directions at right angles to each other.

Referring now to FIGURE 6 of the drawings there is shown a further embodiment of the invention in which the housing 40 on the universal joint is moulded in a self-lubricating thermo-plastic material, such as an acetal resin or nlyon. The housing 40 is moulded with two opposed elongated slots 41, 42 which intersect centrally of the housing. As shown in FIGURE 8 of the drawings the slot 41 receives the inner end of the driven shaft 12 which is suitably drilled to receive the usual connecting pin 13 the ends of which are mounted in diametrically opposed apertures 43 moulded or drilled in the main housing 40. The arrangement is such that the shaft 12 is pivotally mounted and has a limited angular movement with the pin 13 in the slot 41. Similarly, the driving shaft 11 is mounted in the slot 42 by means of a further pin 13 mounted in apertures 44 in the housing 40 so that the shaft 11 has limited angular movement in a direction at right angles to that of the driven shaft 12.

It will be appreciated that the universal couplings as described above have considerable advantages more particularly where a miniature unit is desired, for example in electronic equipment or domestic appliances. The universal joints in accordance with the invention are extremely cheap to produce and are simple in construction. The absence of connecting parts eliminates noise and possible backlash and other disadvantages. Furthermore, by suitable selection of the material of the housing of the coupling it is possible to make the device electrically insulated which has many advantages particularly in electronic applications.

Referring now to FIGURE 9 of the drawings there is shown a composite unit involving the use of a number of universal couplings of the kind described with reference to FIGURES 2 to 4 of the drawings. It will, however, be appreciated that any other form of coupling as described with reference to the other figures may be similarly used and that the couplings as described in FIGURE 9 are merely given by way of example.

In FIGURE 9 of the drawings a driving shaft 50 is mounted in a fixed structure shown diagrammatically by the bracket 51. Axial movement of the shaft 50 is prevented by means of a circlip 52 which is mounted in a slot 53 in the bracket 51. The shaft 50 is located in the bracket 51 so that the driving shaft is located on a constant axial plane.

The outer end 54 of the driving shaft 80 is connected as previously described within the slot 55 of a universal coupling 56. A second universal coupling 57 is connected with the first coupling 56 by means of a short intermediate shaft 58 which is connected pivotally to the couplings 56 and 57 by means of the longitudinally split pins as hereinbefore described. A driven shaft 59 is pivotally connected in the slot 60 of the second coupling 57 by means of the split pins 13 and this driven shaft 59 is mounted in the bracket 51 so as to be located in a constant axial plane which is indicated as being at right angles to the plane of the driving shaft 50. As before, the shaft 59 is restrained against axial movement by means of a circlip 61 located in a groove 62 formed in the bracket 51.

It will be appreciated that by providing a pair of universal couplings 56 and 57 conjoined by a common intermediate shaft 58, that it is possible to provide a system catering for any predetermined angular drive from the driving shaft 50 to the driven shaft 59.

Referring now to the lower part of FIGURE 9 of the drawings it will be seen that the shaft 59 is now connected with a universal coupling 63 which is connected to a further universal coupling 64 by means of an intermediate shaft 65. The coupling 64 is provided with a tongued sleeve 66 which is intended to be positioned over the spindle of a switch or like member to be actuated by the system. It will be appreciated that the drive from the shaft 59 to the sleeve 66 caters for any possible parallel misalignment and this is due to the use of the intermediate shaft 65 between the pair of universal couplings 63 and 64.

The system as described in FIGURE 9 of the drawings is infinitely variable and can be made to cater for both angular and parallel misalignment.

It will be appreciated that the use of a pair of universal couplings of the kind forming the present invention can provide infinitely variable angles of drive and by reason of the simple construction of the joints a very inexpensive form of angle drive can therefore be achieved.

I claim:

1. A drive assembly comprising a coupling member drivably connecting together in end-to-end relationship the adjacent end portions of driving and driven shafts, said member comprising a housing having a pair of slots formed one in each end thereof, said slots extending across the central longitudinal axis of the housing at right angles to each other and receiving therein respectively said adjacent end portions of said shafts, a pair of tubular pins received in respective apertures in said housing and extending across each of said slots, said pins extending through appropriate apertures in respective ones of said shaft end portions, said pins being longitudinally split and having an external diameter relative to said housing and shaft apertures whereby they are loosely received in said housing apertures so as to be pivotable therein and whereby they are resiliently compressed in said shaft apertures so as to be fixed relative thereto, said pins connecting the axes of both said shafts colineally with the central axis of said housing when the angularity of the housing is zero.

2. A drive assembly as claimed in claim 1, wherein the housing is formed from a circular bar and the pins are mounted across diametral slots formed one in each end of the bar.

3. A drive assembly as claimed in claim 1, wherein the housing comprises a shackle in the form of a pair of U-shaped sections positioned back to back and at right angles one to the other, the arms of each U-shaped section supporting one of said pins, to which the corresponding driving or driven member is pivotally connectable.

4. The drive assembly of claim 1, wherein the slots slightly overlap at the center of the housing so that the slots communicate with each other, and the adjacent ends of the driving and driven shafts are located as close together as possible so as to reduce oscillatory movement of the driven shaft of the coupling.

5. A drive assembly as claimed in claim 1, wherein the housing is molded in plastic material and is formed with an axially extending elongated slot in each end thereof for pivotally receiving the driving and driven shafts.

References Cited by the Examiner

UNITED STATES PATENTS

| 797,360 | 8/05 | Kadlowec | 64—2 |
| 1,498,712 | 6/24 | York | 64—17 |
| 1,531,732 | 3/25 | Burkholder | 64—17 |
| 2,669,316 | 2/54 | Schjolin | 64—17 |
| 2,699,656 | 1/55 | Anderson | 64—9 |
| 2,711,199 | 6/55 | Salsberg | 64—2 |
| 2,826,052 | 3/58 | Stillwagon | 64—17 |

FOREIGN PATENTS 227,212  8/43  Switzerland.

MILTON KAUFMAN, *Primary Examiner.*

ROBERT C. RIORDON, *Examiner.*